US010043552B1

(12) United States Patent
Martin (10) Patent No.: US 10,043,552 B1
(45) Date of Patent: Aug. 7, 2018

(54) SYSTEMS AND METHODS FOR PROVIDING THUMBNAILS FOR VIDEO CONTENT (71) Applicant: GOPRO, INC., San Mateo, CA (US)

(72) Inventor: Loïc Martin, Chapareillan (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/289,125

(22) Filed: Oct. 8, 2016

(51) Int. Cl.
G11B 27/34 (2006.01)
G11B 27/10 (2006.01)
G11B 27/30 (2006.01)
H04N 5/232 (2006.01)

(52) U.S. Cl.
CPC ........... G11B 27/34 (2013.01); G11B 27/102 (2013.01); G11B 27/30 (2013.01); H04N 5/23238 (2013.01)

(58) Field of Classification Search
None
See application file for complete search history.

(56) References Cited

U.S. PATENT DOCUMENTS

| | | |
|---|---|---|
| 6,654,019 B2 | 11/2003 | Gilbert |
| 8,022,948 B2 | 9/2011 | Garbow |
| 9,363,569 B1 | 6/2016 | Van Hoff |
| 2003/0160862 A1 | 8/2003 | Charlier |
| 2003/0210327 A1 | 11/2003 | Mory |
| 2004/0010804 A1 | 1/2004 | Hendricks |
| 2004/0125133 A1 | 7/2004 | Pea |
| 2009/0278917 A1 | 11/2009 | Dobbins |
| 2010/0281375 A1* | 11/2010 | Pendergast ........... G11B 27/034 715/723 |
| 2010/0299630 A1 | 11/2010 | McCutchen |
| 2011/0013778 A1 | 1/2011 | Takumai |
| 2012/0206565 A1 | 8/2012 | Villmer |
| 2013/0058535 A1 | 3/2013 | Othmezouri |
| 2013/0177168 A1 | 7/2013 | Inha |
| 2014/0039884 A1 | 2/2014 | Chen |
| 2015/0331242 A1* | 11/2015 | Cho ..................... G02B 27/017 345/8 |
| 2017/0084086 A1* | 3/2017 | Pio ....................... H04N 21/816 |

(Continued)

FOREIGN PATENT DOCUMENTS

WO 2009047572 A1 4/2009
WO 2014090277 A1 6/2014

OTHER PUBLICATIONS

Kopf et al., "First-person Hyper-Lapse Videos" ACM Transactions on Graphics (Proceedings of SIGGRAPH 2014), 33(4), Article No. 78, 2014 (10 pages).

(Continued)

Primary Examiner — Eileen M Adams
(74) Attorney, Agent, or Firm — Sheppard Mullin Richter & Hampton LLP (57) ABSTRACT Visual information defining the video content may be accessed. The video content may have a progress length. Presentation information for the video content may be accessed. The presentation information may define one or more viewing options for the video content. The one or more viewing options may include one or more viewing directions as a function of progress through the video content. One or more thumbnails for the video content may be generated based on the one or more viewing options for the video content.

20 Claims, 10 Drawing Sheets (56) References Cited

U.S. PATENT DOCUMENTS

2017/0085964 A1    3/2017  Chen
2017/0213389 A1*  7/2017  Han .................. H04N 5/44591

OTHER PUBLICATIONS

United States Office Action, U.S. Appl. No. 14/789,706, dated Jun. 7, 2016, ten pages.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkeley.edu/spatialaudiolectures>.

PCT International Search Report and Written Opinion for PCT/US15/38913, Sep. 29, 2015, 15 Pages.

* cited by examiner

FIG. 6D frame 700 thumbnail E 710 thumbnail F 720

FIG. 7

SYSTEMS AND METHODS FOR PROVIDING THUMBNAILS FOR VIDEO CONTENT

FIELD

This disclosure relates to systems and methods that provide thumbnails for video content.

BACKGROUND

Panoramic videos may provide a wide view of a scene. For example, spherical videos may provide a complete view of a scene. It may hard for a person to recognize visuals captured in panoramic videos because visuals are transformed with a projection. For example, a person viewing a spherical video with equirectangular projection may have a hard time understanding the content/context of a scene captured in the spherical video or may have a hard time locating interesting moments within the spherical video.

SUMMARY

This disclosure relates to providing thumbnails for video content. Visual information defining the video content may be accessed. The video content may have a progress length. Presentation information for the video content may be accessed. The presentation information may define one or more viewing options for the video content. The one or more viewing options may include one or more viewing directions as a function of progress through the video content. One or more thumbnails for the video content may be generated based on the one or more viewing options for the video content.

A system that provides thumbnails for video content may include one or more processors, and/or other components. The processor(s) may be configured by machine-readable instructions. Executing the machine-readable instructions may cause the processor(s) to facilitate providing thumbnails for video content. The machine-readable instructions may include one or more computer program components. The computer program components may include one or more of a visual information component, a presentation information component, a thumbnail component, and/or other computer program components.

The visual information component may be configured to access visual information. The visual information may define the video content in one or more projections. Video content may refer to media content that may be consumed as one or more videos. Video content may include one or more videos stored in one or more formats/container, and/or other video content. The video content may have a progress length. In some implementations, the visual information may define the video content in a stereographic projection. In some implementations, video content may include spherical video content. Spherical video content may include video content obtained by a spherical capture. Spherical video content may include 360 degrees or less than 360 degrees capture of video content at one or more locations.

The presentation information component may be configured to access presentation information for the video content. Presentation information may define one or more viewing options for the video content. A viewing option may determine how the video content is presented on a display. The one or more viewing options may include one or more viewing directions as a function of progress through the video content. In some implementations, the one or more viewing directions may be characterized by a yaw parameter, a pitch parameter, and/or other information. In some implementations, the one or more viewing directions may be further characterized by a roll parameter. In some implementations, the one or more viewing options may include a first viewing option at a first point in the progress length and a second viewing option at a second point in the progress length.

In some implementations, the one or more viewing options may be determined based on a user's viewing selections of the video content received during a presentation of the video content on a display and/or other information. In some implementations, the one or more viewing options may be determined based on a user's viewing selections of the video content received prior to a presentation of the video content on a display and/or other information.

In some implementations, the one or more viewing options may include one or more viewing extents as the function of progress through the video content. In some implementations, the one or more viewing options may include one or more viewing projections as the function of progress through the video content. In some implementations, the one or more viewing projections may include an equirectangular projection.

The thumbnail component may be configured to generate thumbnails for the video content. The thumbnails may be generated based on the one or more viewing options for the video content and/or other information. In some implementations, the one or more thumbnails may include a first thumbnail and a second thumbnail. The first thumbnail may be generated based on the first viewing option and the video content at the first point in the progress length. The second thumbnail may be generate based on the second viewing option and the video content at the second point in the progress length.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
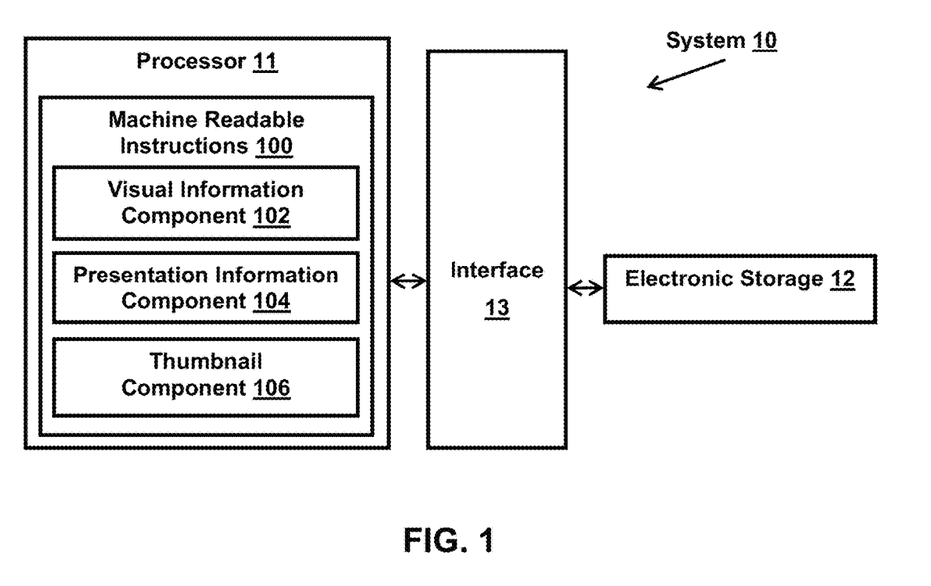
FIG. 1 illustrates a system that provides thumbnails for video content.

FIG. 1 illustrates system 10 for providing thumbnails for video content. System 10 may include one or more of processor 11, electronic storage 12, interface 13 (e.g., bus, wireless interface), and/or other components. Visual information defining the video content may be accessed by processor 11. The video content may have a progress length. Presentation information for the video content may be accessed. The presentation information may define one or more viewing options for the video content. The one or more viewing options may include one or more viewing directions as a function of progress through the video content. One or more thumbnails for the video content may be generated based on the one or more viewing options for the video content.

Figure 3A:
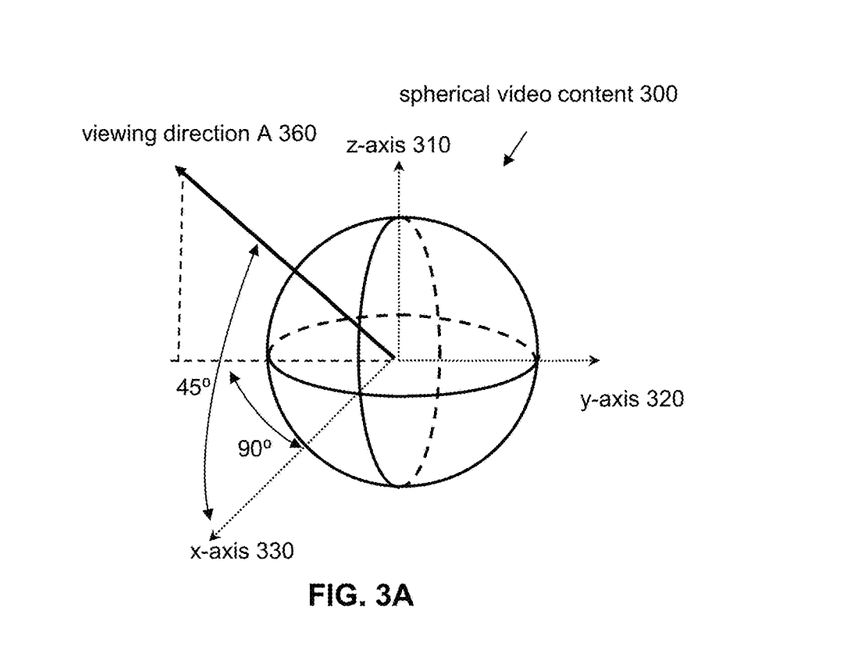
FIG. 3A illustrates an exemplary video content.

Video content may refer to media content that may be consumed as one or more videos. Video content may include one or more videos stored in one or more formats/container, and/or other video content. Video content may have been captured by one or more image sensors. In some implementations, video content may include spherical video content. Spherical video content may include video content obtained by spherical capture. Spherical capture may include the use of one or more cameras/image sensors to capture images/videos. The captured images/videos may be stitched together to form spherical video content. FIG. 3A illustrates an exemplary spherical video content 300. Spherical video content 300 may include a full spherical video capture (360 degrees of capture) or a partial spherical video capture (less than 360 degrees of capture).

Video content may have been captured at a time or at different times. Video content may have been captured at one or more locations. For example, video content may have been captured from a stationary position (e.g., a seat in a stadium). Video content may have been captured from a moving position (e.g., a moving bike). Video content may include video capture from a path taken by the capturing device(s) in the moving position.

The video content may have a progress length. A progress length may be defined in terms of time durations and/or frame numbers. For example, spherical video content 300 may include a video having a time duration of 60 seconds. Spherical video content 300 may include a video having 1800 video frames. Spherical video content 300 may have a play time duration of 60 seconds when viewed at 30 frames/second. Other time durations and frame numbers are contemplated.

Electronic storage 12 may be configured to include electronic storage medium that electronically stores information. Electronic storage 12 may store software algorithms, information determined by processor 11, information received remotely, and/or other information that enables system 10 to function properly. For example, electronic storage 12 may store information relating to visual information, video content, presentation information, viewing options for video content, thumbnails for video content, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate providing thumbnails for video content. Machine readable instructions 100 may include one or more computer program components. Machine readable instructions 100 may include one or more of visual information component 102, presentation information component 104, thumbnail component 106 and/or other computer program components.

Visual information component 102 may be configured to access visual information. The visual information may define one or more video content. Visual information component 102 may access one or more visual information from one or more storage locations. A storage location may include electronic storage 12, electronic storage of one or more image sensors (not shown in FIG. 1), and/or other locations. Visual information component 102 may be configured to access visual information defining one or more video content during acquisition of the visual information and/or after acquisition of the visual information by one or more image sensors. For example, visual information component 102 may access visual information defining a video while the video is being captured by one or more image sensors. Visual information component 102 may access visual information defining a video after the video has been captured and stored in memory (e.g., electronic storage 12).

In some implementations, visual information may define the video content in one or more projections. In some implementations, the visual information may define the video content in a stereographic projection and/or other projections. For example, visual information may include metadata that instructs a video application to display the video content in a stereographic projection and/or other projections.

Presentation information component 104 may be configured to access presentation information for the video content. Presentation information may define one or more viewing options for the video content. A viewing option may determine how the video content is presented on a display. A viewing option may determine how the video content is presented on a display at a moment, at different moment, or over a range of moment over the progress length of the video content. A viewing option may include one or more viewing directions for the video content. A viewing direction may define a direction in which a viewing field of view for the video content is directed. In some implementations, a viewing direction may be characterized by a yaw parameter, a pitch parameter, and/or other information. In some implementations, a viewing direction may be characterized by a roll parameter.

For example, FIG. 3A illustrates exemplary rotational axes for spherical video content 300. Rotational axes for spherical video content 300 may include z-axis 310, y-axis 320, x-axis 330, and/or other axes. A yaw parameter may define an amount of rotation of a viewing direction for spherical video content 300 around z-axis 310. For example, a 0-degree rotation of a viewing direction for spherical video content 300 around z-axis 310 may correspond to a front viewing direction. A 90-degree rotation of a viewing direction for spherical video content 300 around z-axis 310 may correspond to a right viewing direction. A 180-degree rotation of a viewing direction for spherical video content 300 around z-axis 310 may correspond to a back viewing direction. A −90-degree rotation of a viewing direction for spherical video content 300 around z-axis 310 may correspond to a left viewing direction.

A pitch parameter may define an amount of rotation of a viewing direction for spherical video content 300 around y-axis 320. For example, a 0-degree rotation of a viewing direction for spherical video content 300 around y-axis 320 may correspond to a viewing direction that is level with respect to horizon. A 45-degree rotation of a viewing direction for spherical video content 300 around y-axis 320 may correspond to a viewing direction that is pitched up with respect to horizon by 45-degrees. A 90 degree rotation of a viewing direction for spherical video content 300 around y-axis 320 may correspond to a viewing direction that is pitched up with respect to horizon by 90-degrees (looking up). A −45-degree rotation of a viewing direction for spherical video content 300 around y-axis 320 may correspond to a viewing direction that is pitched down with respect to horizon by 45-degrees. A −90 degree rotation of a viewing direction for spherical video content 300 around y-axis 320 may correspond to a viewing direction that is pitched down with respect to horizon by 90-degrees (looking down). Shown in FIG. 3A is exemplary viewing direction A 360 for spherical video content 300. Viewing direction A 360 may be characterized by a 90-degree yaw angle and a 45-degree pitch angle.

A roll parameter may define an amount of rotation of a viewing direction for spherical video content 300 around the viewing direction. For example, a viewing direction may include a 0-degrees rotation of around z-axis 310 and y-axis 320 (a front viewing direction that is level with respect to horizon). Such a viewing direction may be aligned with x-axis 330. A 0-degree rotation of a viewing direction for spherical video content 300 around the viewing direction may correspond to a viewing direction that is upright. A 90 degree rotation of a viewing direction for spherical video content 300 around the viewing direction may correspond to a viewing direction that is rotated to the right by 90 degrees. A −90-degree rotation of a viewing direction for spherical video content 300 around the viewing direction may correspond to a viewing direction that is rotated to the left by 90-degrees.

A viewing option may include different viewing directions as a function of progress through the video content. For example, a viewing option may include a first viewing option at a first point in the progress length, a second viewing option at a second point in the progress length, and/or other viewing options at other points in the progress length. Varying viewing direction for the video content may effectuate view panning for the video content. Varying viewing direction as a function of progress through the video content may allow a user to see different portions of the video content at different points in the progress length of the video content.

Figure 4:
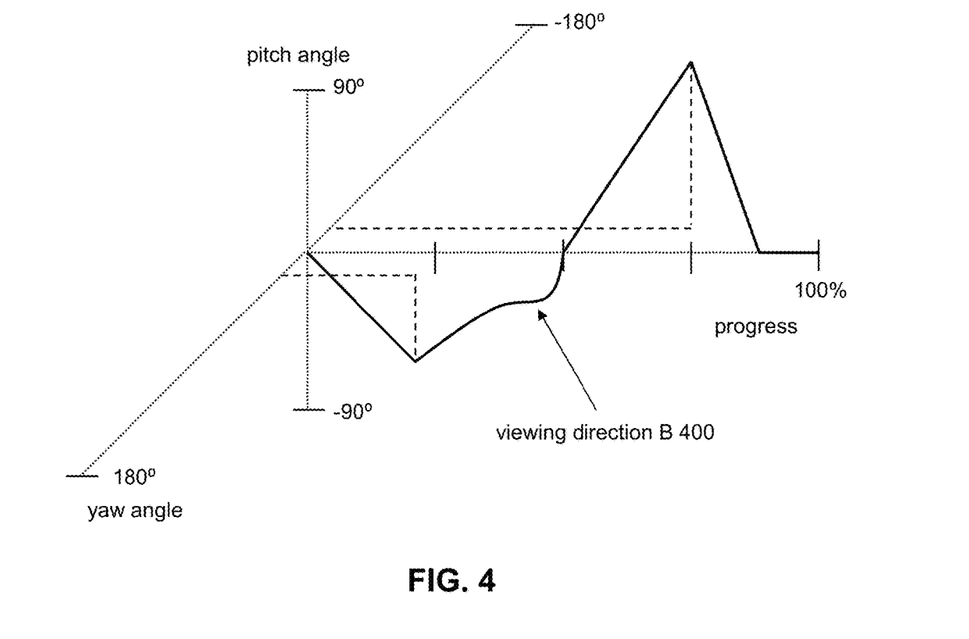
FIG. 4 illustrates exemplary viewing direction for video content.

FIG. 4 illustrates exemplary viewing direction B 400 for spherical video content 300 as a function of progress through spherical video content 300. Viewing direction B 400 may change as a function of progress through spherical video content 300. For example, at 0% progress mark, viewing direction B 400 may be characterized by a zero-degree yaw angle and a zero-degree pitch angle. At 25% progress mark, viewing direction B 400 may be characterized by a positive yaw angle and a negative pitch angle. At 50% progress mark, viewing direction B 400 may be characterized by a zero-degree yaw angle and a zero-degree pitch angle. At 75% progress mark, viewing direction B 400 may be characterized by a negative yaw angle and a positive pitch angle. At 87.5% progress mark, viewing direction B 400 may be characterized by a zero-degree yaw angle and a zero-degree pitch angle.

Figure 3B:
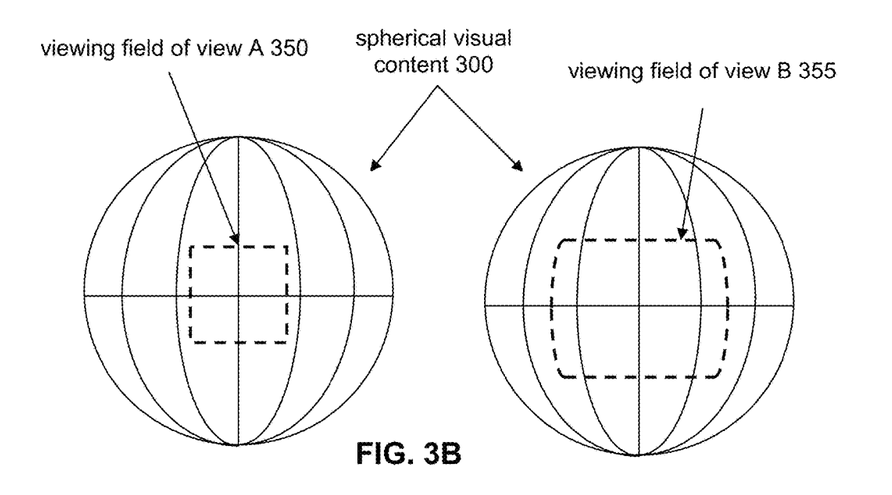
FIG. 3B illustrates exemplary viewing fields of view for video content.

In some implementations, a viewing option may include one or more viewing extents for the video content. A viewing extent may define a size (e.g., zoom, viewing angle) of a viewing field of view for the video content. FIG. 3B illustrates exemplary viewing fields of view with different viewing extents. In FIG. 3B, viewing extent for viewing field of view A 350 may be smaller than viewing extent for viewing field of view B 355. Smaller viewing extent may correspond to a larger zoom for the video content. Larger viewing extent may correspond to a smaller zoom for the video content.

In some implementations, a viewing option may include one or more viewing extents as the function of progress through the video content. Varying viewing extent for the video content may effectuate zoom changes for the video content. Varying viewing extent as a function of progress through the video content may allow a user to see smaller or larger portions of the video content at different points in the progress length of the video content.

In some implementations, a viewing options may include one or more viewing projections for the video content. A viewing projection may define a projection used to display the video content. For example, a viewing projection may include one or more of equirectangular projection, cylindrical projection, Mercator projection, Miller projection, Lambert cylindrical equal area projection, azimuthal projection, rectilinear projection, stereographic projection, fisheye projection, equisolid projection, orthographic projection, cubic projection, sinusoidal projection, transverse mercator projection, Pannini projection, and/or other projections.

In some implementations, a viewing option may include one or more viewing projections as the function of progress through the video content. Varying the viewing projection as a function of progress through the video content may allow a user to see the video content in different viewing projection at different points in the progress length of the video content.

For example, spherical video content 300 may be initially displayed using stereographic projection (based on a default projection of a video application or a default projection of spherical video content 300 defined by visual information). At one or more points in the progress length of spherical video content 300, spherical video content 300 may be displayed using equirectangular projection based on a viewing option including an equirectangular viewing projection.

One or more viewing options may be determined based on a user's viewing selections of the video content. A user's viewing selections of the video content may indicate viewing direction(s), viewing extent(s), viewing projection(s), and/or other viewing options selected by a user for viewing the video content on a display. For example, a user's viewing selections of spherical video content 300 may include viewing direction A 360 (shown in FIG. 3A) or viewing direction B 400 (shown in FIG. 4).

In some implementations, one or more viewing options may be determined based on a user's viewing selections of the video content received during a presentation of the video content on a display and/or other information. A user's viewing selections of the video content may be received during a presentation of the video content on a display via the user's interactions with a video application. A video application may refer to one or more software, one or more software running on one or more hardware (e.g., a mobile device, a desktop device, a camera), and/or other applications operating to present video content on a display. As a non-limiting example, a video application may include one or more of video content player, video content editor, and/or other video applications. A user's viewing selections of the video content may be defined by how a user interacts with a video application to change the viewing direction, viewing extent, viewing projection, and/or other viewing options during the presentation of the video content on a display.

In some implementations, one or more viewing options may be determined based on a user's viewing selections of the video content received prior to a presentation of the video content on a display and/or other information. A user's viewing selections of the video content may be received prior to a presentation of the video content on a display via the user's interactions with a video application. A user's viewing selections of the video content may be defined by how a user interacts with a video application to set the viewing direction, viewing extent, viewing projection, and/or other viewing options during a subsequent presentation of the video content on a display. For example, a video application may include a video content editor and a user's viewing selections of the video content may include a user's instruction for the video content indicating how (e.g., in what direction) the video content should be presented (e.g., as a default view) when played on a video content player.

Figure 5:
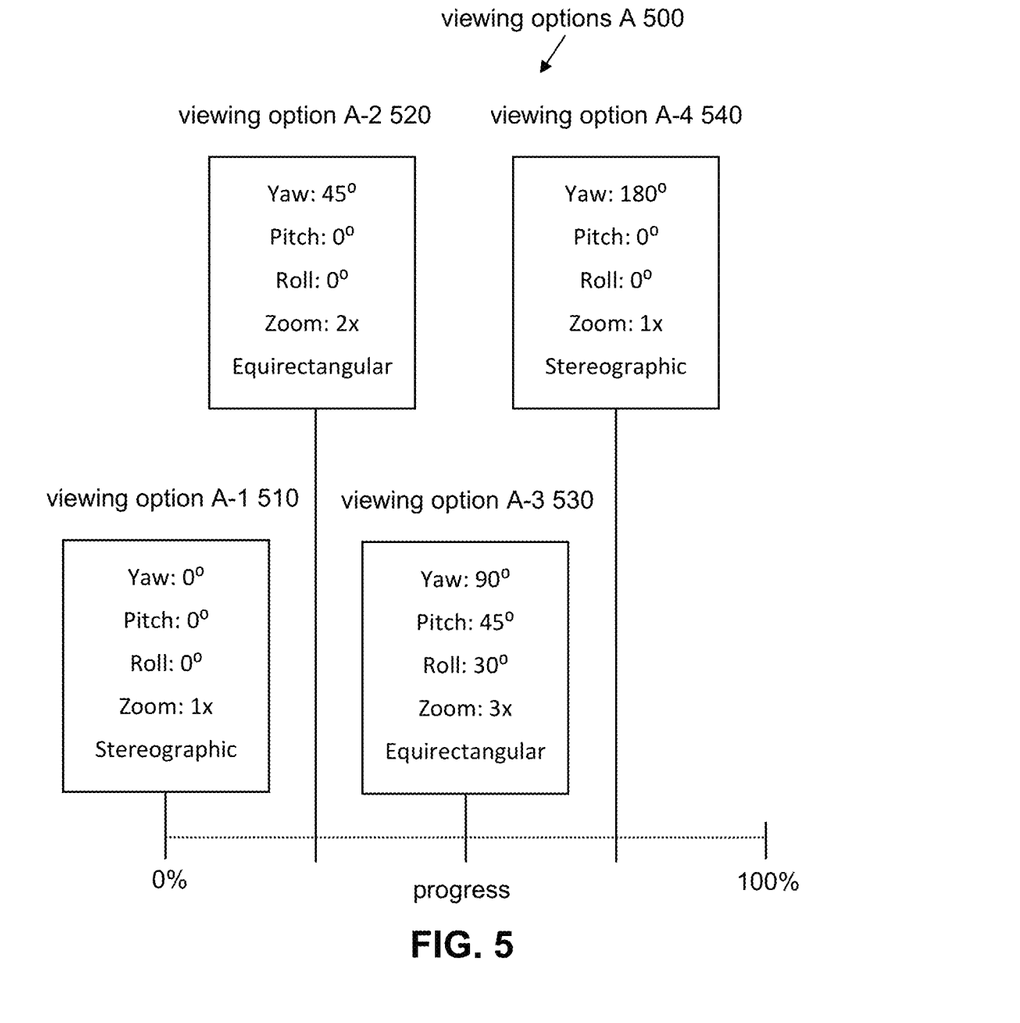
FIG. 5 illustrates exemplary viewing options for video content.
Figure 6A:
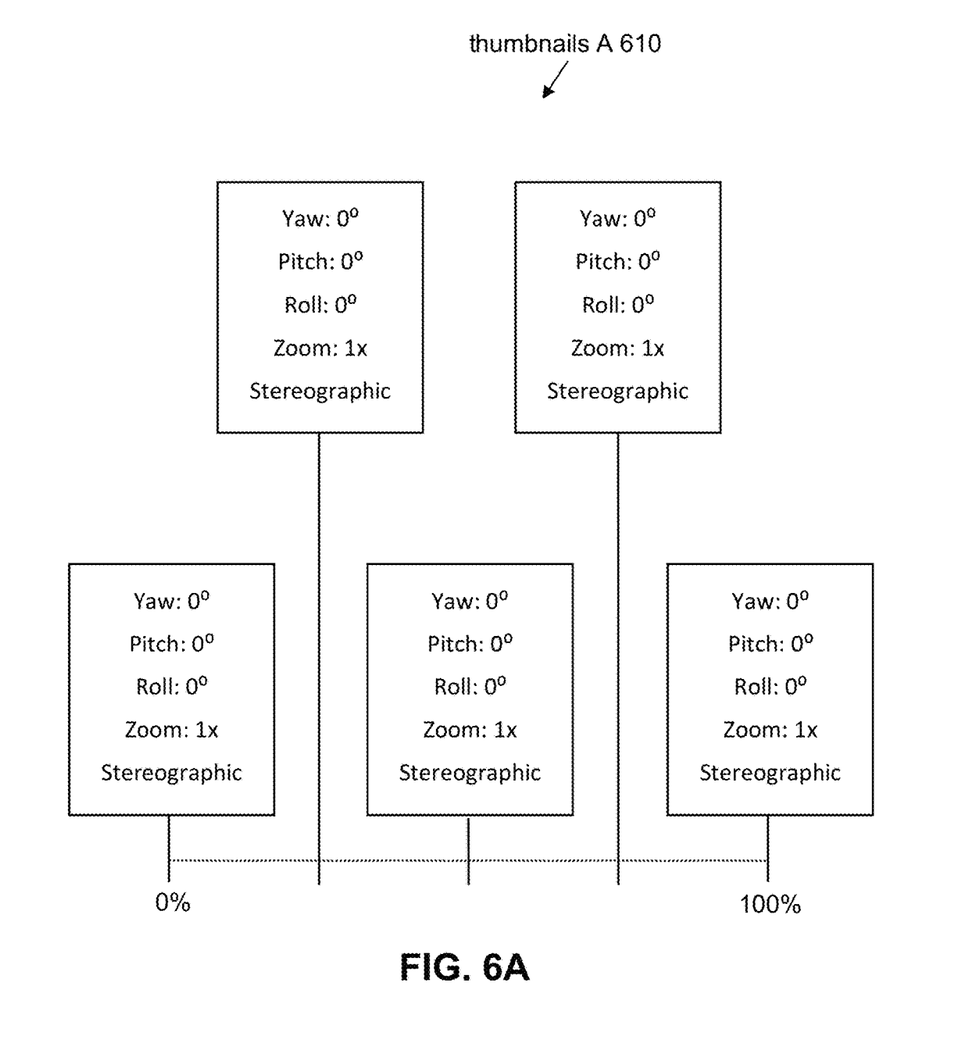
FIGS. 6A-6D illustrate exemplary thumbnails for video content.
Figure 6B:
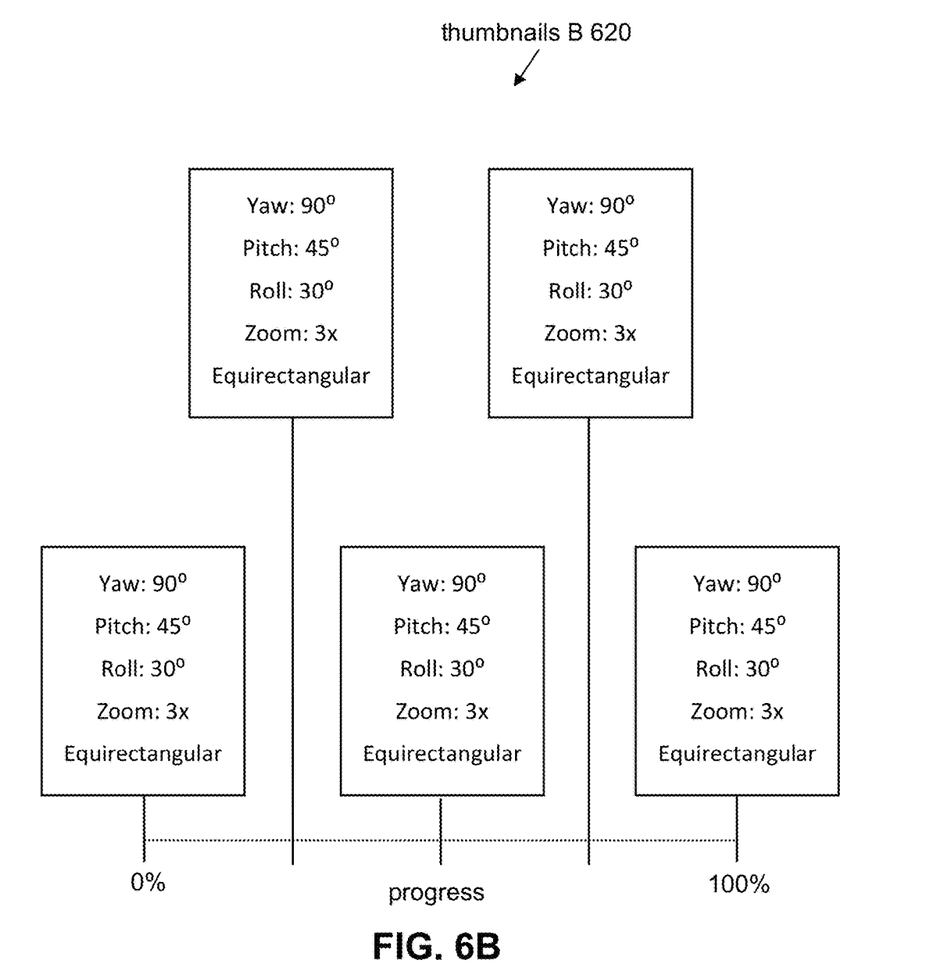
Figure 6C:
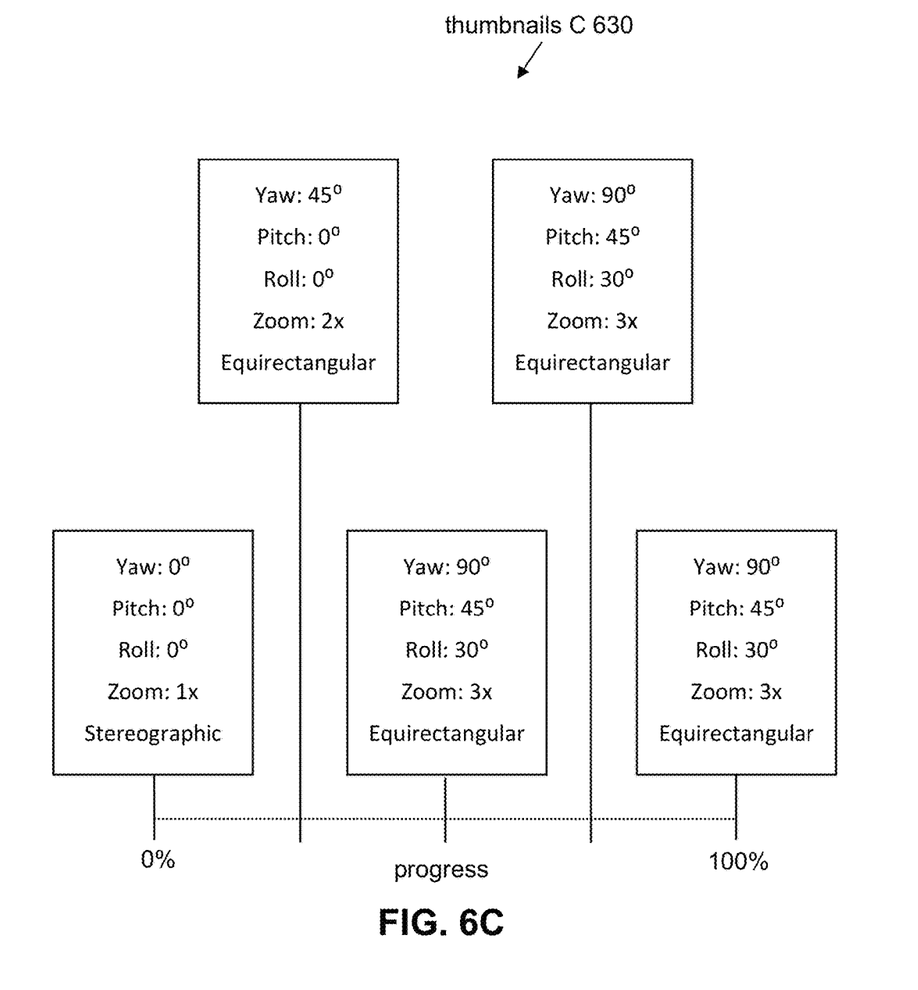
Figure 6D:
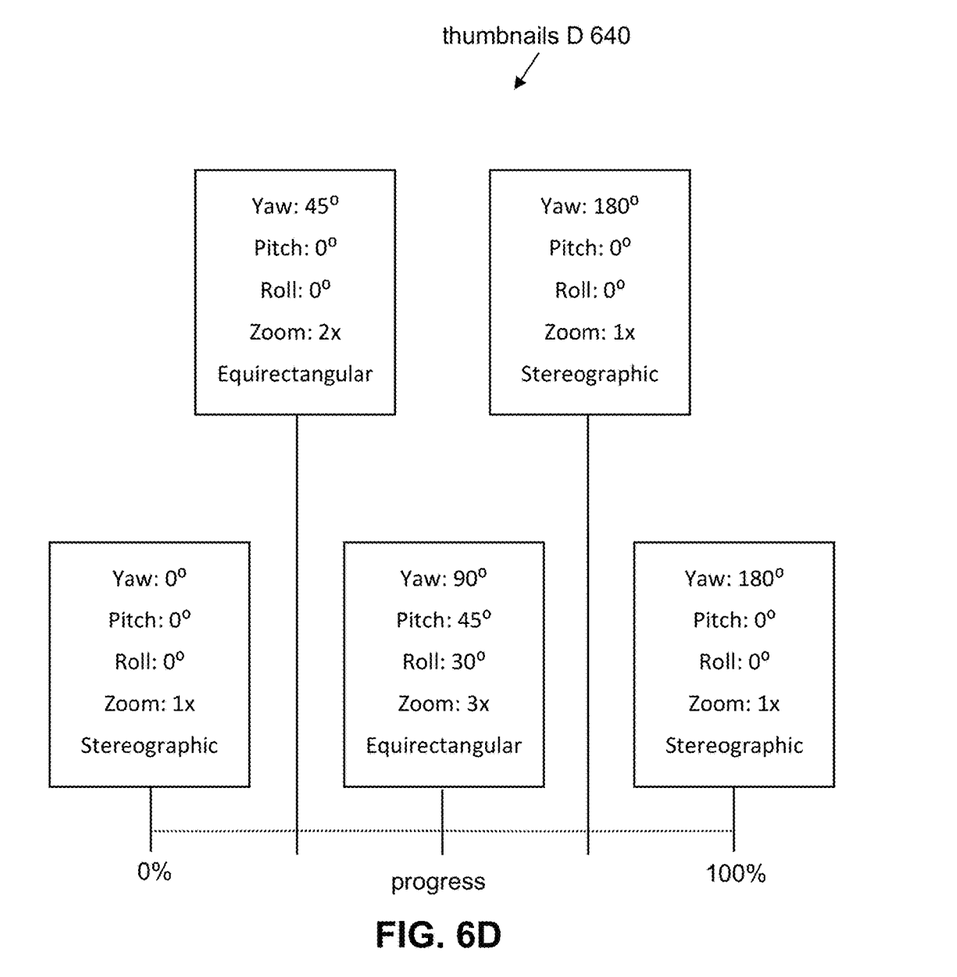

FIG. 5 illustrates exemplary viewing options A 500 of spherical video content 300. Viewing options A 500 may be determined based on a user's viewing selection of spherical video content 300 received during presentation of spherical video content 300 on a display and/or other information. Viewing options A 500 may be determined based on a user's viewing selections of spherical video content 300 received prior to a presentation of spherical video content 300 on a display and/or other information. Viewing options A 500 may include viewing option A-1 510, viewing option A-2 520, viewing option A-3 530, viewing option A-4 540, and/or other viewing options.

Viewing options A 500 may change as a function of progress through spherical video content 300. Between 0%-25% progress mark, viewing option A-1 510 may be characterized by a 0-degree yaw angle, a 0-degree pitch angle, a 0-degree roll angle, a zoom of 1×, a stereographic projection, and/or other viewing options. Between 25%-50% progress mark, viewing option A-2 520 may be characterized by a 45-degree yaw angle, a 0-degree pitch angle, a 0-degree roll angle, a zoom of 2×, an equirectangular projection, and/or other viewing options. Between 50%-75% progress mark, viewing option A-3 530 may be characterized by a 90-degree yaw angle, a 45-degree pitch angle, a 30-degree roll angle, a zoom of 3×, an equirectangular projection, and/or other viewing options. Between 75%-100% progress mark, viewing option A-4 540 may be characterized by a 180-degree yaw angle, a 0-degree pitch angle, a 0-degree roll angle, a zoom of 1×, a stereographic projection, and/or other viewing options.

Thumbnail component 106 may be configured to generate thumbnails for the video content. Thumbnails may be generated based on one or more viewing options for the video content and/or other information. In some implementations, one or more thumbnails may include a first thumbnail, a second thumbnail, and/or other thumbnails. The first thumbnail may be generated based on a first viewing option and the video content at a first point in the progress length. The second thumbnail may be generate based on a second viewing option and the video content at a second point in the progress length. Other thumbnails may be generate based on other viewing options and the video content at other points in the progress length.

FIGS. 6A-6D illustrate exemplary thumbnails 610, 620, 630, 640 generated for video content. Thumbnails 610, 620, 630, 640 may be generated by thumbnail component 106 based on viewing options A 500 and/or other information.

Thumbnails A 610 (shown in FIG. 6A) may be generated based on viewing options determined based on a user's viewing selection received during presentation of spherical video content 300 between 0%-25% progress mark. For example, at 5% progress mark, a user may be viewing spherical video content 300 using viewing option A-1 510. Thumbnail component 106 may generate thumbnails A 610 based on viewing option A-1 510. Thumbnail A 610 may include views of spherical video content 300 (e.g., views at 0% progress mark, 25% progress mark, 50% progress mark, 75% progress mark, 100% progress mark, and/or other progress marks) characterized by a 0-degree yaw angle, a 0-degree pitch angle, a 0-degree roll angle, a zoom of 1×, and a stereographic projection.

Thumbnails B 620 (shown in FIG. 6B) may be generated based on viewing options determined based on a user's viewing selection received during presentation of spherical video content 300 between 50%-75% progress mark. For example, at 60% progress mark, a user may be viewing spherical video content 300 using viewing option A-3 530. Thumbnail component 106 may generate thumbnails B 620 based on viewing option A-3 530. Thumbnail A 610 may include views of spherical video content 300 (e.g., views at 0% progress mark, 25% progress mark, 50% progress mark, 75% progress mark, 100% progress mark, and/or at other progress marks) characterized by a 90-degree yaw angle, a 45-degree pitch angle, a 30-degree roll angle, a zoom of 3×, and an equirectangular projection.

In some implementations, thumbnail component 106A may generate thumbnails based on current viewing option and prior viewing options. For example, thumbnails C 530 (shown in FIG. 6C) may be generated based on viewing options determined based on a user's viewing selection received during presentation of spherical video content 300 between 0%-75% progress mark. For example, between 0%-25% progress mark, a user may have viewed spherical video content 300 using viewing option A-1 510. Between 25%-50% progress mark, a user may have viewed spherical video content 300 using viewing option A-2 520. Between 50%-60% progress mark, a user have (and may be) viewing spherical video content 300 using viewing option A-3 530. For 0%-25% progress mark, thumbnails C 630 may be generated based on viewing option A-1 510 and may include views of spherical video content 300 characterized by a 0-degree yaw angle, a 0-degree pitch angle, a 0-degree roll angle, a zoom of 1×, and a stereographic projection. For 25%-50% progress mark, thumbnails C 630 may be generated based on viewing option A-2 520 and may include views of spherical video content 300 characterized by a 45-degree yaw angle, a 0-degree pitch angle, a 0-degree roll angle, a zoom of 2×, an equirectangular projection. For 50%-100% progress mark, thumbnails C 630 may be generated based on viewing option A-3 530 and may include views of spherical video content 300 characterized by a 90-degree yaw angle, a 45-degree pitch angle, a 30-degree roll angle, a zoom of 3×, and an equirectangular projection.

Thumbnails D 640 (shown in FIG. 6D) may be generated based on viewing options determined based on a user's viewing selection received prior to a presentation of spherical video content 300. For example, thumbnails D 640 may be generated based on a user's instructions for spherical video content 300 indicating how spherical video content 300 should be presented (e.g., as a default view) when played on a video content player. A user's instructions for spherical video content 300 may include viewing options A 500, and thumbnails D 640 may be generated based on viewing option A-1 510, viewing option A-2 520, viewing option A-3 530, and viewing option A-4 540. For 0%-25% progress mark, thumbnails D 640 may be generated based on viewing option A-1 510 and may include views of spherical video content 300 characterized by a 0-degree yaw angle, a 0-degree pitch angle, a 0-degree roll angle, a zoom of 1×, and a stereographic projection. For 25%-50% progress mark, thumbnails D 640 may be generated based on viewing option A-2 520 and may include views of spherical video content 300 characterized by a 45-degree yaw angle, a 0-degree pitch angle, a 0-degree roll angle, a zoom of 2×, and an equirectangular projection. For 50%-75% progress mark, thumbnails D 640 may be generated based on viewing option A-3 530 and may include views of spherical video content 300 characterized by a 90-degree yaw angle, a 45-degree pitch angle, a 30-degree roll angle, a zoom of 3×, and an equirectangular projection. For 75%-100% progress mark, thumbnails D 640 may be generated based on viewing option A-4 540 and may include views of spherical video content 300 characterized by a 180-degree yaw angle, a 0-degree pitch angle, a 0-degree roll angle, a zoom of 1×, and a stereographic projection.

In some implementations, thumbnails may be generated based on viewing options determined based on a user's viewing selection received during presentation of video content and based on viewing options determined based on a user's viewing selection received prior to presentation of the video content. For example, initial thumbnails for video content may be generated based on a user's instructions for the video content indicating how the video content should be presented (e.g., as a default view) when played on a video content player. During the presentation of the video content, a user may change the viewing option from the default view to a custom view. Thumbnails for the portions of the video content viewed using the custom view may be generated based on the user's viewing selection (corresponding to the custom view) received during presentation of the video content.

Figure 7:
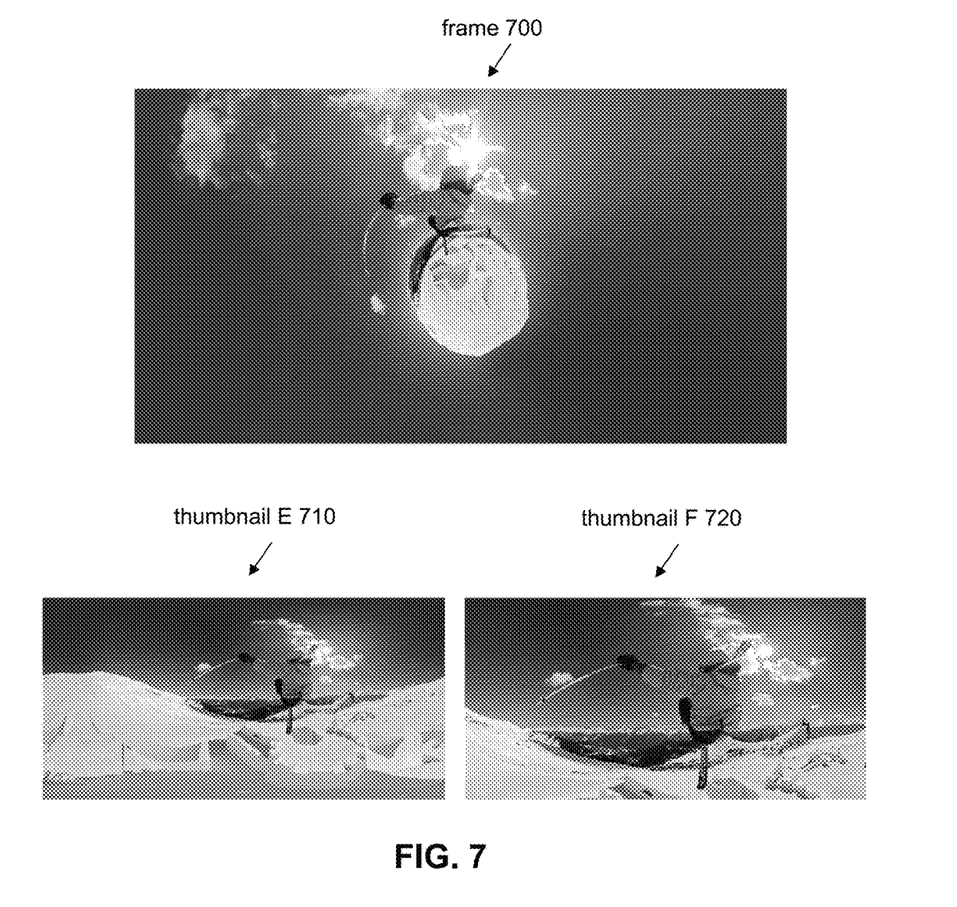
FIG. 7 illustrates an exemplary frame of video content and exemplary thumbnails for the frame.

FIG. 7 illustrates an exemplary frame 700 of video content and exemplary thumbnails 710, 720 for frame 700. Frame 700 may include a spherical capture of a scene including a jumping skier. A default view of the video content may include a view of the video content using a stereographic projection. At a particular point in the progress length of the video content, frame 700 may be presented on a display.

A viewing option for the video content may change how the video content is presented on the display. For example, a viewing option for the video content may indicate that the video content is to be displayed using equirectangular projection. Based on the viewing option for the video content, thumbnail component 106 may generate thumbnail E 710 for thumbnail 700. Thumbnail E 710 may include a view of frame 700 in equirectangular projection. As another example, a viewing option for the video content may indicate that the video is to be displayed using equirectangular projection, at a 2× zoom, and using viewing field of view directed at a particular yaw and/or pitch angle. Based on the viewing option for the video content, thumbnail component 106 may generate thumbnail F 720 for thumbnail 700. Thumbnail F 720 may include a view of frame 700 in equirectangular projection, at the 2× zoom, and directed using the particular yaw and/or pitch angle.

In some implementations, thumbnail component 106 may generate one or more thumbnail for video content in response to the video content being presented on a display. For example, thumbnail component 106 may generate thumbnails for the video content in response to the video content being played on a mobile device. In some implementations, thumbnail component 106 may generate one or more thumbnails for video content in response to a user using a seek bar of a video content player. For example, a user may be using a video content player of a mobile device to play the video content. The user may use the seek bar of the video content player to see what happens at different moments in the video content. Thumbnail component 106 may generate one or more thumbnails for the video content in response to the user using the seek bar. The thumbnails may be presented to the user to use as previews of what happens at different moments in the video content.

In some implementations, thumbnail component 106 may generate one or more thumbnails for video content in response to the video content being stored/uploaded to a particular electronic storage. For example, thumbnail component 106 may generate thumbnails for the video content in response to the video content being uploaded by a mobile device to a server. In some implementations, thumbnail component 106 may generate one or more thumbnails for video content in response to the video content being encoded. For example, thumbnail component 106 may generate thumbnails for the video content in response to the video content being encoded by a server. The server may generate the thumbnails and send the thumbnails (e.g., in a thumbnail grid or as individual thumbnails) to the mobile device. In some implementations, the server may send the thumbnails to the mobile device when the server receives information that a user of the mobile device is using a seek bar of a video content player. Other timing for generation and communication of thumbnails are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, and/or 106 may be eliminated, and some or all of its functionality may be provided by other computer program components. As another example, processor 11 may be configured to execute one or more additional computer program components that may perform some or all of the functionality attributed to one or more of computer program components 102, 104, and/or 106 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
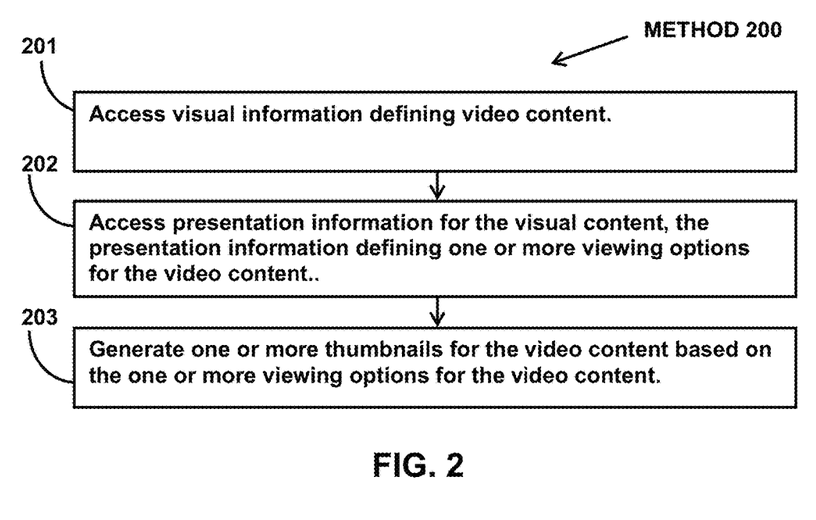
FIG. 2 illustrates a method for providing thumbnails for video content.

FIG. 2 illustrates method 200 for providing thumbnails for video content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, visual information defining video content may be accessed. The video content may have progress length. In some implementation, operation 201 may be performed by a processor component the same as or similar to visual information component 102 (Shown in FIG. 1 and described herein).

At operation 202, presentation information for the video content may be accessed. The presentation information may define one or more viewing options for the video content. In some implementations, operation 202 may be performed by a processor component the same as or similar to presentation information component 104 (Shown in FIG. 1 and described herein).

At operation 203, one or more thumbnails may be generated for the video content based on the viewing options for the video content. In some implementations, operation 203 may be performed by a processor component the same as or similar to thumbnail component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing thumbnails for video content, the system comprising:
   one or more physical processors configured by machine-readable instructions to: access visual information defining spherical video content, the spherical video content including the video content obtained by spherical capture, the spherical video content having a progress length;
   access presentation information for the spherical video content prior to presentation of the spherical video content on a display, the presentation information including instructions defining default viewing options for the spherical video content, the default viewing options including multiple viewing directions as a function of progress through the spherical video content, wherein the default viewing options include a first default viewing option at a first point in the progress length and a second default viewing option at a second point in the progress length;
   present the spherical video content on the display based on the presentation information, the presentation of the spherical video content on the display including presentation of a seek bar, the seek bar enabling a user to select points in the progress length of the spherical video content to be presented on the display; determine user interaction with the seek bar indicating the user's selection of a given point in the progress length of the spherical video content; responsive to the user interaction with the seek bar, generate a thumbnail for the given point in the progress length of the spherical video content based on a corresponding default viewing option for the spherical video content, wherein the thumbnail includes a first thumbnail based on the given point being the first point and a second thumbnail based on the given point being the second point, the first thumbnail generated based on the first default viewing option and the spherical video content at the first point in the progress lengthy and the second thumbnail generated based on the second default viewing option and the spherical video content at the second point in the progress length; and present the thumbnail on the display as a preview of the spherical video content at the given point in the progress length.

2. The system of claim 1, wherein individual viewing directions define individual directions in which a viewing field of view for the spherical video content is directed.

3. The system of claim 1, wherein the multiple viewing directions are characterized by a yaw parameter and a pitch parameter.

4. The system of claim 3, wherein the multiple viewing directions are further characterized by a roll parameter.

5. The system of claim 1, wherein the default viewing options include one or more viewing extents as the function of progress through the spherical video content.

6. The system of claim 1, wherein the default viewing options include one or more viewing projections as the function of progress through the spherical video content.

7. The system of claim 6, wherein the visual information defines the spherical video content in a stereographic projection, and the one or more viewing projections include an equirectangular projection.

8. The system of claim 1, wherein the the thumbnail for the spherical video content is generated further based on the user's viewing selections of the spherical video content received during the presentation of the spherical video content on the display.

9. The system of claim 1, wherein the default viewing options are determined based on the user's viewing selections of the spherical video content during a prior presentation of the spherical video content.

10. A method for providing thumbnails for video content, the method comprising:
accessing visual information defining spherical video content, the spherical video content including the video content obtained by spherical capture, the spherical video content having a progress length;
accessing presentation information for the spherical video content prior to presentation of the spherical video content on a display, the presentation information including instructions defining default viewing options for the spherical video content, the default viewing options including multiple viewing directions as a function of progress through the spherical video content,
wherein the default viewing options include a first default viewing option at a first point in the progress length and a second default viewing option at a second point in the progress length;
presenting the spherical video content on the display based on the presentation information, the presentation of the spherical video content on the display including presentation of a seek bar, the seek bar enabling a user to select points in the progress length of the spherical video content to be presented on the display;
determining user interaction with the seek bar indicating the user's selection of a given point in the progress length of the spherical video content;
responsive to the user interaction with the seek bar, generating a thumbnail for the given point in the progress length of the spherical video content based on a corresponding default viewing option for the spherical video content,
wherein the thumbnail includes a first thumbnail based on the given point being the first point and a second thumbnail based on the given point being the second point, the first thumbnail generated based on the first default viewing option and the spherical video content at the first point in the progress length and the second thumbnail generated based on the second default viewing option and the spherical video content at the second point in the progress length; and presenting the thumbnail on the display as a preview of the spherical video content at the given point in the progress length.

11. The method of claim 10, wherein individual viewing directions define individual directions in which a viewing field of view for the spherical video content is directed.

12. The method of claim 10, wherein the multiple viewing directions are characterized by a yaw parameter and a pitch parameter.

13. The method of claim 12, wherein the multiple viewing directions are further characterized by a roll parameter.

14. The method of claim 10, wherein the default viewing options include one or more viewing extents as the function of progress through the spherical video content.

15. The method of claim 10, wherein the default viewing options include one or more viewing projections as the function of progress through the spherical video content.

16. The method of claim 15, wherein the visual information defines the spherical video content in a stereographic projection, and the one or more viewing projections include an equirectangular projection.

17. The method of claim 10, wherein the the thumbnail for the spherical video content is generated further based on the user's viewing selections of the spherical video content received during the presentation of the spherical video content on the display.

18. The method of claim 10, wherein the default viewing options are determined based on the user's viewing selections of the spherical video content during a prior presentation of the spherical video content.

19. A system for providing thumbnails for video content, the system comprising:
one or more physical processors configured by machine-readable instructions to: access visual information defining spherical video content, the spherical video content including the video content obtained by spherical capture, the spherical video content having a progress length;
access presentation information for the spherical video content prior to presentation of the spherical video content on a display, the presentation information including instructions defining one or more default viewing options for the spherical video content,
the one or more default viewing options including multiple viewing directions as a function of progress through the spherical video content, one or more viewing extents as the function of progress through the spherical video content, and one or more viewing projections as a function of progress through the spherical video content, wherein the one or more default viewing directions are characterized by a yaw parameter and a pitch parameter;

present the spherical video content on the display based on the presentation information, the presentation of the spherical video content on the display including presentation of a seek bar, the seek bar enabling a user to select points in the progress length of the spherical video content to be presented on the display;

determine user interaction with the seek bar indicating the user's selection of a given point in the progress length of the spherical video content:

responsive to the user interaction with the seek bar, generate a thumbnail for the given point in the progress length of the spherical video content based on the one or more corresponding default viewing options for the spherical video content; and present the thumbnail on the display as a preview of the spherical video content at the given point in the progress length.

20. The system of claim 19, wherein:

individual viewing directions define individual directions in which a viewing field of view for the spherical video content is directed;

the one or more default viewing options include a first default viewing option at a first point in the progress length and a second default viewing option at a second point in the progress length; and the thumbnail includes a first thumbnail based on the given point being the first point and a second thumbnail based on the given point being the second point, the first thumbnail generated based on the first default viewing option and the spherical video content at the first point in the progress length, and the second thumbnail generated based on the second default viewing option and the spherical video content at the second point in the progress length.

\* \* \* \* \*

UNITED STATES PATENT AND TRADEMARK OFFICE
CERTIFICATE OF CORRECTION

PATENT NO. : 10,043,552 B1
APPLICATION NO. : 15/289125
DATED : August 7, 2018
INVENTOR(S) : Loïc Martin Page 1 of 1

It is certified that error appears in the above-identified patent and that said Letters Patent is hereby corrected as shown below:

In the Claims

In Claim 1, Column 13, Line 12, please replace "lengthy" with --length,--.

Signed and Sealed this
Sixth Day of November, 2018

Andrei Iancu
*Director of the United States Patent and Trademark Office*